United States Patent

Stortz

[11] Patent Number: 6,108,426
[45] Date of Patent: Aug. 22, 2000

[54] AUDIO POWER MANAGEMENT

[75] Inventor: James L. Stortz, Spring, Tex.

[73] Assignee: Compaq Computer Corporation, Houston, Tex.

[21] Appl. No.: 08/703,361

[22] Filed: Aug. 26, 1996

[51] Int. Cl.$^7$ .................................................. H04B 3/00
[52] U.S. Cl. .............................................. 381/77; 381/124
[58] Field of Search ........................ 381/124, 77, 68, 381/68.2, 68.4, 107, 98; 455/127, 343; 379/58; 330/51; 700/94

[56] References Cited

U.S. PATENT DOCUMENTS

| | | |
|---|---|---|
| 3,952,161 | 4/1976 | Gilbert et al. ............................ 381/10 |
| 5,014,017 | 5/1991 | Ishiguro et al. .......................... 330/51 |
| 5,167,024 | 11/1992 | Smith et al. ............................. 395/375 |
| 5,222,150 | 6/1993 | Tajima ..................................... 381/77 |
| 5,381,460 | 1/1995 | Ohashi ..................................... 379/58 |
| 5,404,586 | 4/1995 | Ishiguro ................................... 455/127 |
| 5,473,775 | 12/1995 | Sakai et al. .............................. 395/700 |
| 5,530,923 | 6/1996 | Heinonen et al. ....................... 455/127 |
| 5,590,401 | 12/1996 | Ide et al. ................................. 455/343 |
| 5,606,313 | 2/1997 | Allen et al. .............................. 455/343 |

Primary Examiner—Vivian Chang
Attorney, Agent, or Firm—Paul N. Katz; Ronald L. Chichester; Frohwitter

[57] ABSTRACT

Power consumption of an audio system of a computer is controlled, in response to an audio power management event, by altering the operation of the audio system in a manner that changes the power consumption of the audio system.

33 Claims, 2 Drawing Sheets

AUDIO POWER MANAGEMENT

BACKGROUND

This invention relates to audio power management.

Personal computers, and especially portable personal computers frequently use power management methods to reduce power consumption either in periods of disuse or when power resources are changed, for example, when power is switched from AC line current to a battery. Power management methods typically include shutting down or "graying out" a computer display, shutting down most of the central microprocessor activity, reducing memory power consumption, and turning off spinning disk drives.

Audio systems in personal computers have grown sophisticated, with sound synthesis generators, filtering, automatic gain control, stereo channels, and other high quality features. As audio systems become more sophisticated, their power demands increase. High quality audio power systems may require in excess of 4 watts of power under peak conditions. Such power demands may be especially difficult to sustain in portable computers, where conservation of battery resources to maximize user time between chargings is often a priority.

SUMMARY

In general, in one aspect, the invention features a method for controlling the power consumption of an audio system of a computer, including responding to an audio power management event by altering the operation of the audio system in a manner that changes the power consumption of the audio system.

Embodiments of the invention may include the following features. The audio power management event may occur after a period of computer disuse, after a period of disuse of the audio system, when a power resource is changed, for example, from a line current to a battery supply, or when the energy left in a battery of the computer drops below a threshold. Altering the operation may include switching the audio system from a stereo mode to a monaural mode, switching the audio system from two sets of speakers to one set, limiting the output volume of the audio system, enabling automatic gain control performed by the audio system, or changing the filtering performed by the audio system. Changing of the filtering may include shutting off filtering performed by the audio system, or increasing low pass filtering performed by the audio system.

In general, in another aspect, the invention features an audio power management apparatus including an audio system, and an audio power manager coupled to the audio system, where the audio power manager alters the operation of the audio system in response to an audio power management event in a manner that changes the power consumption of the audio system.

Embodiments of the invention may include the following features. The audio power management event may occur after a period of computer disuse, after a period of disuse of the audio system, when a power resource is changed, for example, from a line current to a battery supply, or when the energy left in a battery of the computer drops below a threshold. The audio system may also include a number of features responsive to the audio power manager, including two stereo mode channels, at least one of which is switchably responsive to the audio power manager, a degradable sound generator, an automatic gain controller responsive to the audio power manager, and a filter whose characteristics are responsive to the audio power manager. The filter may include a switchably engaged low pass filter responsive to the audio power manager. The audio power manager can be implemented in software code, as part of an operating system of a computer coupled to the audio system, stored within a computer BIOS, or can be software code which runs on a microprocessor coupled to a computer coupled to the audio system.

In general, in another aspect, the invention features a computer system including a microprocessor, an audio system coupled to the microprocessor, and an audio power manager coupled to the audio system, where the audio power manager alters the operation of the audio system in response to an audio power management event in a manner that changes the power consumption of the audio system.

The advantages of the invention may include one or more of the following. The power consumption of an audio system for a computer may be gracefully reduced, without completely losing sound quality. A computer user may still hear relatively good quality sound effects and cues while minimizing power loading. By selectively shutting down, implementing, or altering audio resources such as stereo effects, filtering, and automatic gain control, an audio system may selectively reduce power consumption while retaining some sound quality.

Other features and advantages of the invention will become apparent from the following description and from the claims.

DESCRIPTION

Figure 1:
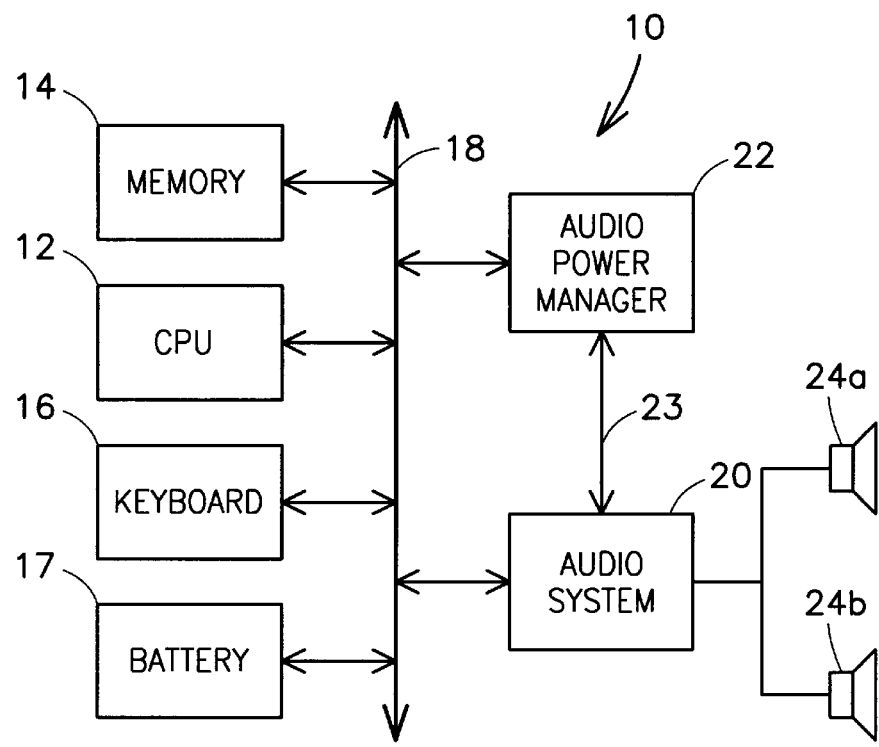
FIG. 1 is a schematic diagram of a portable computer implementing audio power management.

Referring to FIG. 1, a portable computer 10 includes a microprocessor CPU 12, a memory 14 (for example, linear DRAM for operating system, programs and data), a keyboard 16, and battery power supply 17, all coupled via bus 18 (which can be one or more separate bus lines, e.g., microprocessor bus, ISA bus, and PCI bus). Audio system 20 couples to bus 18 as well, is controlled by audio power manager 22, via control line(s) 23, and drives speakers 24a and 24b (which may be sets of speakers, one set for each of two stereo channels).

Figure 2:
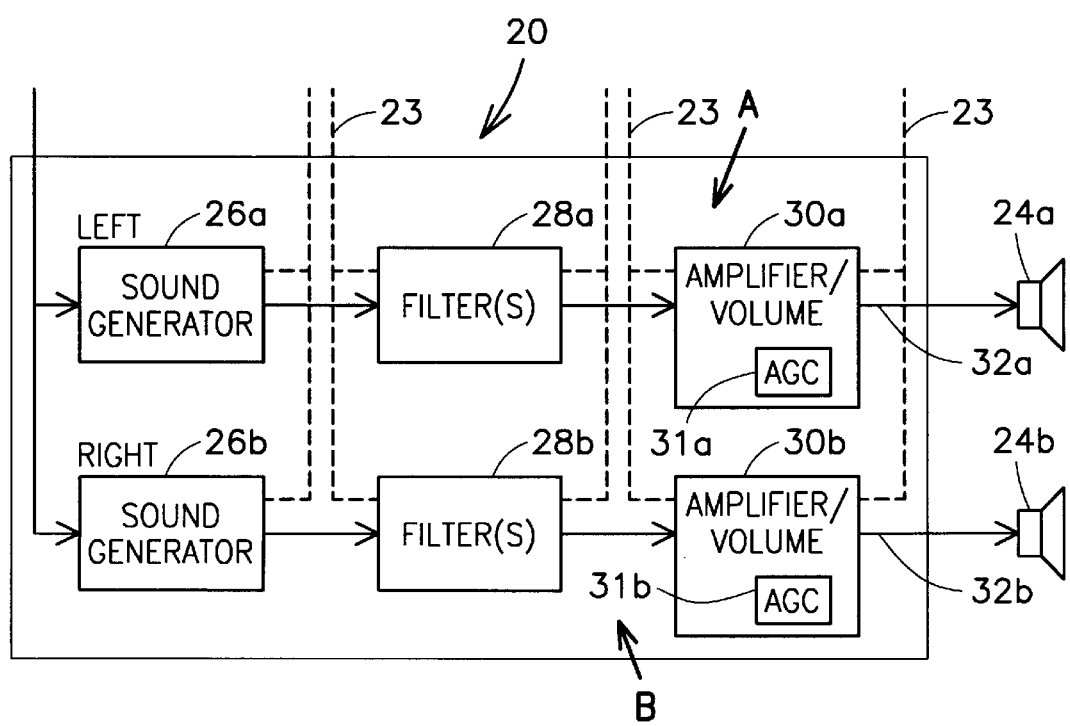
FIG. 2 is a schematic diagram of an audio system.

Referring to FIG. 2, audio system 20 includes two separate stereo channels, a left channel A and a right channel B. Each channel includes a sound generator 26a (and 26b), one or more filter blocks 28a (and 28b), and an amplifier and/or volume control block 30a (and 30b) which may include automatic gain control circuitry 31a (and 31b). Each channel drives its respective speakers 24a and 24b via connections 32a and 32b.

Figure 3:
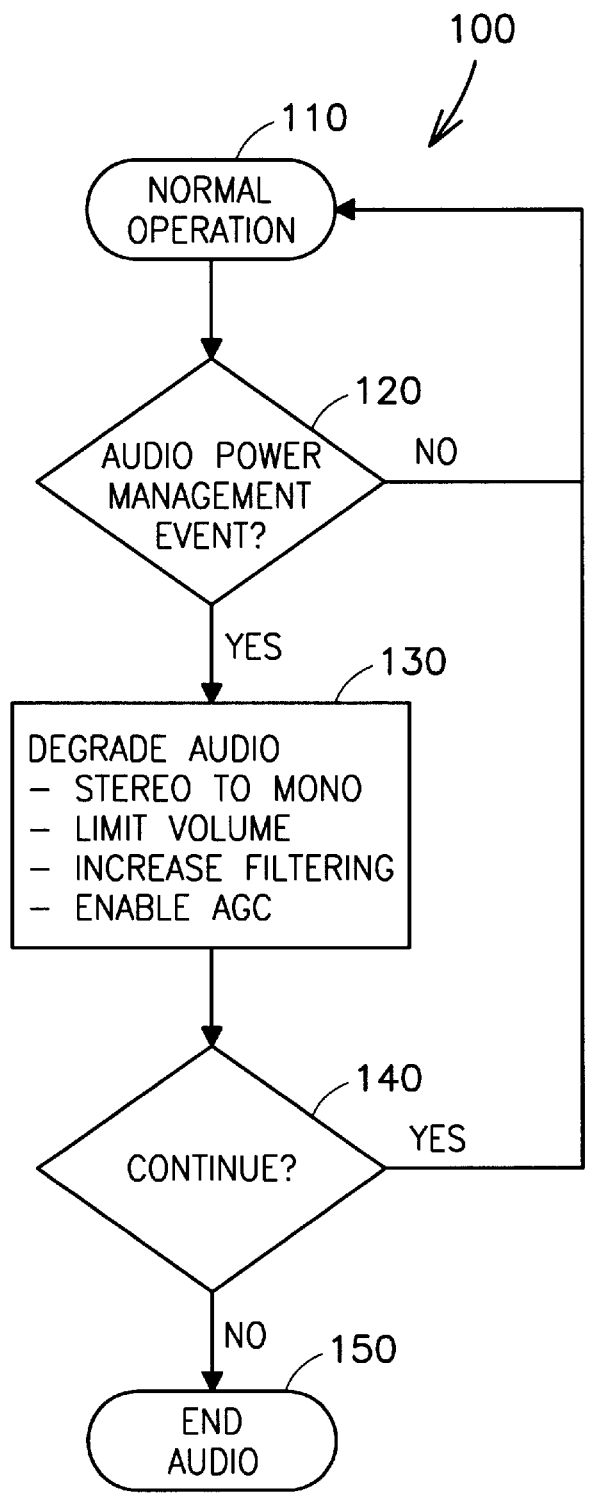
FIG. 3 is flow chart for audio power management.

Flow chart 100 (FIG. 3) describes the general operation of the audio power management system. During normal operation (step 110), audio system 20 performs any or all of its available functions (e.g., stereo sound, appropriate filtering, full volume control, sound generation, etc.).

An audio power management event (step 120) can be generated for a variety of reasons. For example, if the power source is switched from AC current to battery supply 17, or if battery power supply 17 is running low, a signal may be sent to audio power manager 22 (along with other power management systems within computer 10). Or, if the user has not been operating computer 10 (or audio system 20) for some time-out period, an audio power management event signal can be generated. Further, audio power manager 22 can take control of the timing of audio reductions, and thus, in effect, trigger its own audio power management events. For example, once computer power has begun to drop, audio power manager 22 can degrade audio operation in a selective and increasingly more severe way, at regular intervals. Signals for audio power management events may be conveyed as some form of a conventional interrupt, as messages, flags or other signaling mechanisms provided by an operating system, or as separate electrical signals over dedicated control lines 23.

Once audio power manager 22 receives an audio power management event signal, it can then degrade the audio capability of the audio system 20 in a selective way (step 130), to reduce power consumption and audio quality in a more graceful manner. As noted, one of the channels A or B can be switched off (or can enter a low power consumption mode), thereby using either speaker 24a or 24b in a substantially monaural mode. The performance of sound generators 26a and 26b can be degraded, for example, by using fewer synthesizer voices, etc. The volume control can be reduced, and the automatic gain control system can be employed to reduce power consumption by maintaining speaker output within a particular (lower) output range. Filtering can be changed, degraded or completely switched off. For example, low-pass filtering can be added to eliminate bass frequencies that consume the most power at speakers 24, generating a "tinnier", yet often acceptable sound.

After power management control (step 130) has degraded audio performance, audio operation can resume (step 140), and await further audio power management events and/or control by audio power manager 22. If all possible degradation has been made, and no further power reductions exist, audio system 20 can be completely shut down (step 150).

Other embodiments are within the scope of the claims. For example, the functions of the audio power manager may be combined with the audio system as one unit. The audio power manager may, instead of waiting for signals to be generated by other systems (for example, the battery power supply), actively interrogate the computer's power consumption. The audio power manager may be implemented as a programmed microprocessor chip, or as software code, loaded within any system resource, for example, the 8051 microprocessors in typical keyboard controllers, the system BIOS, or the operating system. Any number of specific, power-consuming audio features may be gracefully turned off to minimize power use.

What is claimed is:

1. A method for controlling the power consumption of an audio system of a computer, comprising:
   monitoring a parameter that is unrelated to the audio system operation and is indicative of a power conservation opportunity associated with power being delivered to the computer,
   triggering an audio power management event in response to the parameter, and
   altering the low frequency spectral power components of the audio system in a manner that reduces the power consumption of the audio system while continuing to provide intelligible audio output.

2. The method of claim 1 wherein the audio power management event occurs after a period of computer disuse.

3. The method of claim 1 wherein the audio power management event occurs after a period of disuse of the audio system.

4. The method of claim 1 wherein the audio power management event occurs when a power resource is changed.

5. The method of claim 4 wherein the power resource is changed from a line current to a battery supply.

6. The method of claim 1 wherein the audio power management event occurs when the energy left in a battery of the computer drops below a threshold.

7. The method of claim 1 wherein the altering of the operation comprises switching the audio system from a stereo mode to a monaural mode.

8. The method of claim 1 wherein the altering of the operation comprises switching the audio system from two sets of speakers to one set.

9. The method of claim 1 wherein the altering of the operation comprises limiting the output volume of the audio system.

10. The method of claim 1 wherein the altering of the operation further comprises enabling automatic gain control performed by the audio system.

11. The method of claim 1 wherein the altering of the operation comprises changing the filtering performed by the audio system.

12. The method of claim 11 wherein the changing of the filtering further comprises ending filtering performed by the audio system.

13. The method of claim 11 wherein the changing of the filtering further comprises increasing low pass filtering performed by the audio system.

14. Audio power management apparatus, comprising:
   an audio system; and
   an audio power manager coupled to the audio system, where the audio power manager monitors a parameter that is unrelated to the audio system operation and is indicative of a power conservation opportunity associated with power being delivered to the computer, and alters the low frequency spectral power components of the audio system in response to an audio power management event triggered in response to the parameter in a manner that reduces the power consumption of the audio system while continuing to provide intelligible audio output.

15. The apparatus of claim 14 wherein the audio power management event occurs after a period of computer disuse.

16. The apparatus of claim 14 wherein the audio power management event occurs after a period of disuse of the audio system.

17. The apparatus of claim 14 wherein the audio power management event occurs when a power resource is changed.

18. The apparatus of claim 17 wherein the power resource is changed from a line current to a battery supply.

19. The apparatus of claim 14 wherein the audio power management event occurs when the energy left in a battery of a computer drops below a threshold.

20. The apparatus as in claim 14 wherein the audio system comprises two stereo mode channels, at least one of which being switchably responsive to the audio power manager.

21. The apparatus as in claim 14 wherein the audio system comprises a degradable sound generator responsive to the audio power manager.

22. The apparatus of claim 14 wherein the audio system further comprises an automatic gain controller responsive to the audio power manager.

23. The apparatus as in claim 14 wherein the audio system comprises a filter whose characteristics are responsive to the audio power manager.

24. The apparatus as in claim 23 wherein the filter includes a switchably engaged low pass filter responsive to the audio power manager.

25. The apparatus of claim 14 wherein the audio power manager is a programmed microprocessor.

26. The apparatus of claim 14 wherein the audio power manager is implemented in software code.

27. The apparatus of claim 26 wherein the software code is part of an operating system of a computer coupled to the audio system.

28. The apparatus of claim 26 wherein the software code is stored within a computer BIOS.

29. The apparatus of claim 26 wherein the software code runs on a microprocessor coupled to a computer coupled to the audio system.

30. A computer system comprising:

a microprocessor;

an audio system coupled to the microprocessor; and an audio power manager coupled to the audio system, where the audio power manager monitors a parameter that is unrelated to the audio system operation and is indicative of a power conservation opportunity associated with power being delivered to the computer, and alters the low frequency spectral power components of the audio system in response to an audio power management event triggered in response to the parameter in a manner that reduces the power consumption of the audio system while continuing to provide intelligible audio output.

31. A method for controlling the power consumption of an audio system of a computer, comprising:

monitoring a parameter that is unrelated to the audio system operation and is indicative of a power conservation opportunity associated with power being delivered to the computer, in response to an audio power management event triggered in response to the parameter, altering the low frequency spectral power components of the audio system in a manner that reduces the power consumption of the audio system while continuing to provide intelligible audio output.

32. The method of claim 31, further comprising:

enabling automatic gain control performed by the audio system.

33. The method of claim 31, wherein the low frequency spectral power component of the audio system is reduced by changing the filtering performed by the audio system.

* * * * *